Aug. 19, 1969   S. W. BAILEY ET AL   3,462,096
BRAKE, LOCK AND RELEASE MECHANISM FOR AUTOMATIC REWIND REELS
Filed Nov. 13, 1967   2 Sheets-Sheet 2
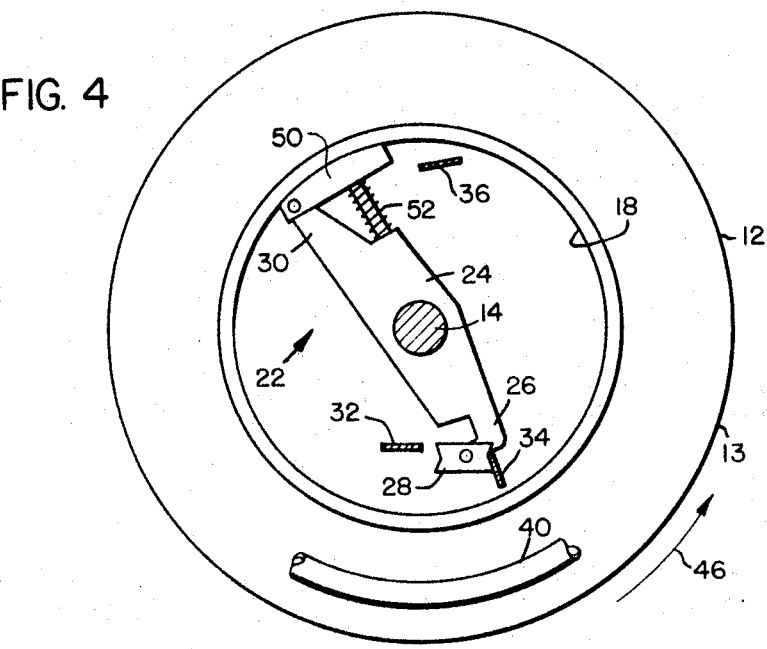
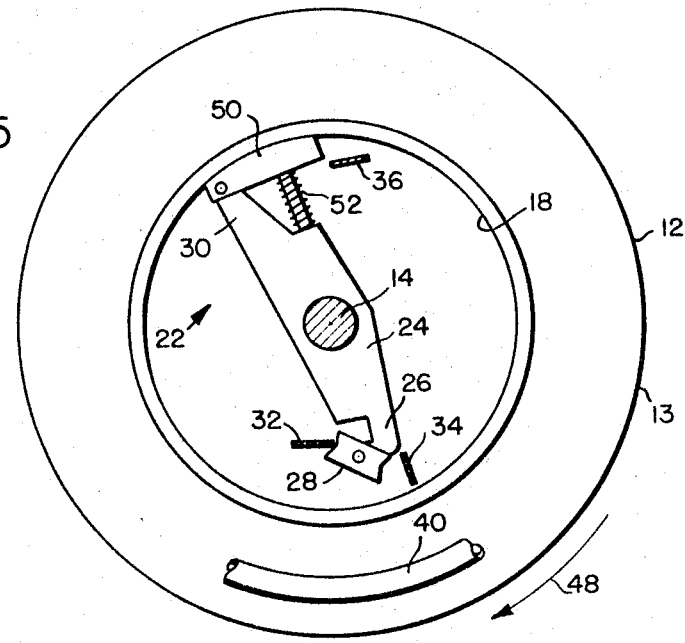
INVENTORS
SIDNEY W. BAILEY
JOHN R. MONTGOMERY
BY *Theodore B. Roessel*
ATTORNEY

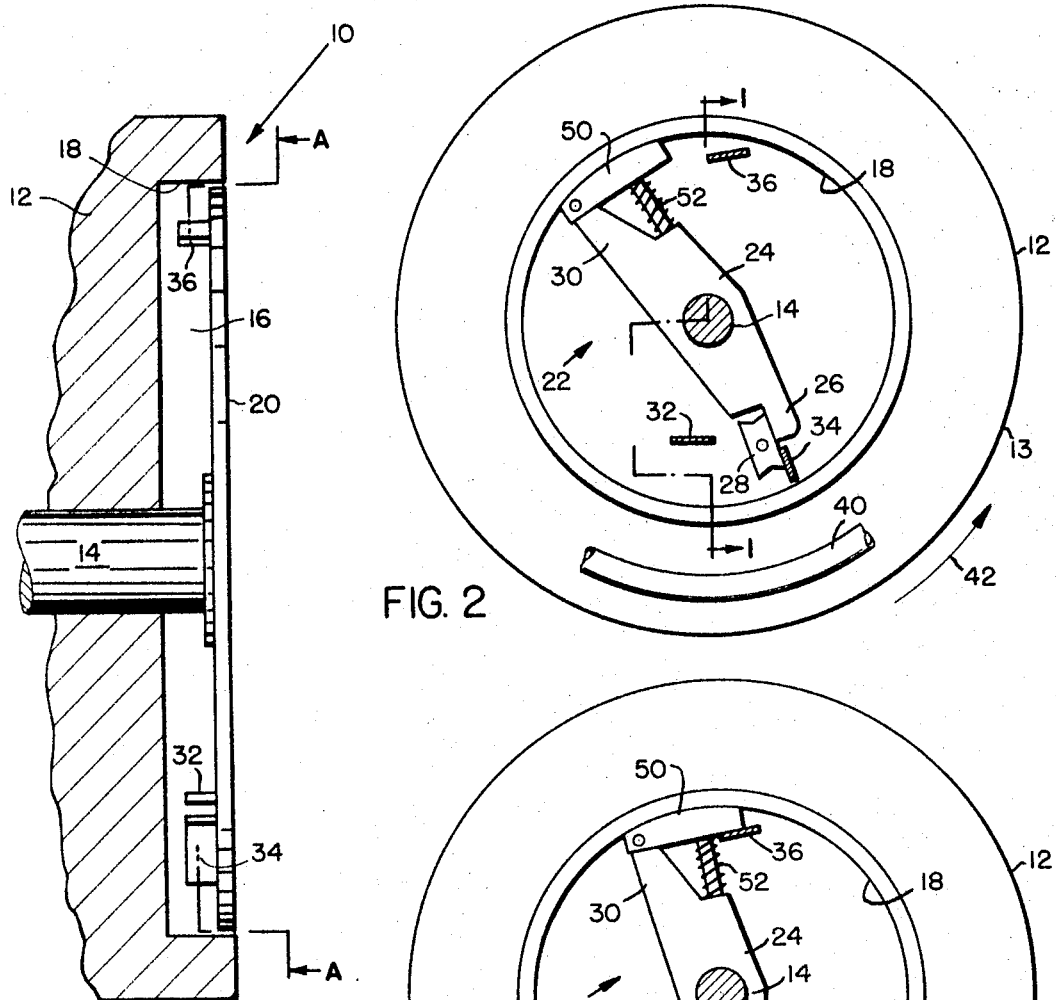

United States Patent Office 3,462,096
Patented Aug. 19, 1969

3,462,096
BRAKE, LOCK AND RELEASE MECHANISM FOR AUTOMATIC REWIND REELS
Sidney W. Bailey and John R. Montgomery, Trumbull, Conn., assignors to Sybron Corporation, Rochester, N.Y., a corporation of New York
Filed Nov. 13, 1967, Ser. No. 682,308
Int. Cl. B65h 75/48, 17/44
U.S. Cl. 242—107.7                                                  7 Claims

ABSTRACT OF THE DISCLOSURE

Disclosed is a brake mechanism for automatic rewind reels which includes a brake drum formed in the hub of a reel. A brake shoe, engageable with the drum, is adapted to oscillate cyclically about the center of the hub through arcs of greater and lesser lengths and moves into tight frictional engagement with the drum only when the shoe travels through the greater arcs.

BACKGROUND OF THE INVENTION

The present invention relates to brake mechanisms and more specifically to brake mechanisms used in reels, wherein a cord, hose or the like stored on the reel is subjected to a rewind torque when extended from the reel and released.

In many instances, a utility, such as water, air or electricity, is delivered through a hose, cord or the like to a point of use. In this respect, the hose or cord having one end connected to the utility is stored on a reel, and simply pulled from the reel to deliver the utility to a point of use. When the utility is no longer needed, it is desirable to construct the reel so that it will automatically retrieve the length of the hose or cord which was initially extended to the point of use. In this respect, any suitable means, such as a coil spring can be incorporated into the reel to supply the necessary rewind torque to the reel for retrieving the length of extended hose or cord. Since the reel is subject to a rewind torque whenever the hose or cord is extended, it is also desirable to provide some sort of lock or brake mechanism to hold the hose or cord in the extended position against the rewind torque. Such a brake or lock permits the operator to manipulate the delivery end of the hose or cord while the utility is being used without having to provide the physical force necesary to overcome the rewind torque.

Many brake or lock mechanisms have been used in the prior art for this purpose. For example, many such lock means operate on a ratchet and pawl principle, wherein the rotating wheel is locked only at set intervals. In another type of lock mechanism the hose or cord is provided along its length with protuberant elements which engage a receiver on the reel frame to lock the reel against the rewind torque. Still another brake mechanism has a device which frictionally engages the hose or cord to prevent the same from being retrieved by the rewind torque. These prior art brakes or lock mechanisms have all proved unsuitable for one reason or another. For example, a device that frictionally engages the hose or cord produces wear which requires that the hose or cord be replaced at frequent intervals. Devices which lock only at set intervals along the length of the hose or cord are not flexible in that the hose or cord can only be locked at specific pullout lengths. Other locking devices are awkward to operate in that they require the hose or cord to be manipulated into one position for locking and another position for unlocking the reel.

SUMMARY OF THE INVENTION

In the present invention a brake mechanism for an automatic rewind reel includes a brake drum in the hub of the reel. A brake arm pivoted at its center to the shaft about which the reel rotates, can itself rotate clockwise and counterclockwise through arcs of greater and lesser lengths. Pivoted at one end of the brake arm in a brake shoe, which moves into tight frictional engagement with the brake drum only when the brake arm travels through a greater arc. A star wheel pivoted at the other end of the brake arm is indexed after each clockwise or counterclockwise movement of the arm to alternate the length of the arcs traveled by the brake arm between the greater and the lesser length.

Since the brake mechanism acts on the hub of the rewind reel, any possibility of the hose or cord wearing due to frictional engagement with the brake mechanism is eliminated. The brake of the present invention also permits the hose or cord to be locked at any position over the entire pullout length, thereby increasing the convenience to the operator. Furthermore, the brake of the present invention is set or released by simply pulling and releasing the hose or cord thereby eliminating much of the manipulation which was required to set such a brake in the prior art.

OBJECTS OF THE INVENTION

The invention has for an object a construction of a brake mechanism for automatic rewind reels and the like, which effectively locks the reel against a rewind torque.

Another object of the invention is to provide a brake mechanism for automatic rewind storage reels which permits a hose or cord stored on the reel to be pulled from the reel and locked at any pullout length against the action of a rewind torque.

A further object of the invention is to provide a brake mechanism for automatic rewind storage reels which engages the reel for locking.

An additional object of the present invention is to provide a brake mechanism for automatic rewind reels which is engaged and disengaged by a cyclic pull and release of the cord or hose stored on the reel.

Yet another object of the invention is to provide a brake mechanism for automatic rewind reels which employs a star wheel mechanism to index a brake shoe into and out of engagement with a brake drum carried by the storage reel.

DESCRIPTION OF THE DRAWINGS

FIGURE 1 is a sectional view taken along lines 1—1 of FIGURE 2 showing the cover for the hub of the reel, in position, certain portions of hteb rake mechanism being removed for purposes of clarity; and FIGURES 2 through 5 are views taken along line A—A of FIGURE 1 showing the cyclic operation of the brake mechanism of our invention.

DESCRIPTION OF THE PREFERRED EMBODIMENTS

Referring now to the drawings, FIGURE 1 shows the hub, generally indicated at 10 of a storage reel, a portion of the reel being indicated at 12. Reel 12 is rotatably mounted on a stationary shaft or valve 14 which is supported by a frame not shown. It should be understood that reel 12 is any conventional type of storage reel which is adapted to receive a hose, cord or other flexible elongated article about its periphery. It should also be understood that the reel contains any suitable means (not shown) for applying a rewind torque to the reel as the article is pulled therefrom, which will rotate the reel in a direction to retrieve the article back onto the reel when the article is released.

Formed in hub 10 of the reel by machining or casting is a recess 16, the outer periphery 18 of the recess being a brake drum against which the brake mechanism of the present invention operates to lock the reel against the action of the rewind torque. A plate member 20, rigidly attached to axle 14 provides a cover for recess 16 and in addition, carries three cam stops 32, 34 and 36. The cam stops extend from cover plate 20 and into recess 16 and provide the means for setting and releasing the brake in a manner to be described in more detail hereinbelow.

Turning now to FIGURES 2 through 5, we see the brake mechanism of our invention generally indicated at 22 to include a brake arm 24 rotatably mounted on shaft 14. Pivoted to one end 26 of the brake arm is a star wheel 28, and pivoted to the other end 30 of the brake arm is a brake shoe 50. A spring element 52 carried adjacent end 30 of the brake arm is provided for urging the brake shoe into slight frictional engagement with brake drum 18. With brake shoe 50 being held in slight frictional engagement with brake drum 18 by spring 52 it will be appreciated that brake arm 24 can rotate clockwise or counterclockwise together with the rotation of reel 12. However, the length of the arms through which the ends 30 and 26 of brake arm 24 can rotate are limited by the disposition of cam stops 32, 34 and 36.

As shown in FIGURES 2 and 4, cam stop 34 defines the limit of counterclockwise rotation of the brake arm and as shown in FIGURES 3 and 5 the limit of clockwise rotation is defined either by cam stop 36 (FIGURE 3) or cam stop 32 (FIGURE 5), depending upon the position of star wheel 28. For example, with the star wheel in the position shown in FIGURE 5, the engagement of the star wheel and cam stop 32 prevents further clockwise rotation of the brake arm. However, with the star wheel in the position shown in FIGURE 3, cam stop 32 does not engage the star wheel which permits the brake arm to continue to rotate in a clockwise direction through an additional arc increment until brake shoe 50 engages cam stop 36.

Although the brake mechanism of our invention can be used in connection with any storage reel of the type described, we shall describe the operation of our invention in connection with a reel for storing a hose. Furthermore, referring to FIGURES 2 through 5, the numeral 13 refers to the outer peripheral portion of a reel, a portion of which is shown at 12 and the numeral 40 indicates a portion of a hose stored on the outer periphery of the reel.

Now to describe the method of operation of our inventin and by way of illustration only, we shall describe the cycle of operation as beginning with a hose indicated schematically at 40 (FIGURE 2) being pulled from reel 12. As indicated by arrow 42 in FIGURE 2, hub 10 and reel 12 rotate in a counterclockwise direction about stationary shaft 14 when the hose is pulled from the reel. The slight frictional engagement between brake shoe 50 and brake drum 18 tends to move brake arm 24 in a counterclockwise direction in co-rotation with the hub 10. However, the abutment between star wheel 28 and cam stop 34 prevents such co-rotation and since there is only slight frictional engagement between brake shoe 50 and brake drum 18, the hub and reel will continue to rotate in a counterclockwise direction until the desired length of hose has been pulled from the periphery 13 of reel 12. When the desired length of hose has been pulled from the reel, the hose is released, which causes a rewind torque exerted by any conventional means (not shown) to begin rotating the reel in clockwise direction as indicated by arrow 44 in FIGURE 3 to retrieve the hose.

The slight frictional engagement between brake shoe 50 and brake drum 18 also tends to move brake arm 24 in a clockwise direction in co-rotation with the reel. Rotation of arm 24 in a clockwise direction carries star wheel 28 into contact with cam stop 32. The engagement of cam stop 32 and star wheel 28 causes the star wheel to rotate to the position shown in FIGURE 3, which permits brake arm 24 to continue rotating in a clockwise direction. Brake arm 24 continues to rotate clockwise until brake shoe 50 makes contact with cam stop 36 which directs the brake shoe radially outward into tight frictional engagement with brake drum 18 stopping further rotation of the storage reel. Thus, the hose is effectively locked at its pulled out length against the effects of the rewind torque. In fact, the brake becomes more effective as the strength of the rewind torque increases. In this respect, a strong rewind torque will merely draw brake shoe 50 further against cam stop 36, which in turn forces the brake shoe into tighter frictional engagement with brake drum 18. With reel 12 thus locked against the rewind torque the operator can easily manipulate the delivery end of the hose.

To release the lock for retrieving all or portion of the hose that has been extended, the hose is simply pulled which rotates reel 12 and hub 10 in a counterclockwise direction as indicated by arrow 46 in FIGURE 4. The tight frictional engagement between brake shoe 50 and brake drum 18 also causes the brake shoe and therefore brake arm 24 to rotate in a counterclockwise direction. By rotating counterclockwise, the brake shoe is withdrawn from cam stop 36 thereby releasing the lock and restoring the condition wherein the brake shoe and brake drum are in slight frictional engagement. With the brake shoe and brake drum in slight frictional engagement brake arm 24 is driven in corotation with the hub 10 until star wheel 28 comes into contact with cam stop 34, which stops further rotation of the brake arm and indexes the star wheel to the position shown in FIGURE 4.

From this point of operation two alternatives are present, that is either the hose can be released so that the rewind torque will begin to retrieve the hose onto the reel periphery 13, or the hose can be pulled to a still greater pullout length and locked at this new position. Assuming the former alternative is desired, the hose after being pulled to release the lock as set out hereinabove is simply released to permit the rewind torque to begin retrieving all or a part of the extended portion of the hose.

When the hose is released, the rewind torque begins to rotate the hub and reel clockwise as indicated by arrow 48 in FIGURE 5. The slight frictional engagement between brake shoe 50 and brake drum 18, also causes brake arm 24 to move in a clockwise direction, in co-rotation with the hub and reel. Star wheel 28 is also moved clockwise until contact is made with cam stop 32. The engagement of cam stop 32 and star wheel 28 causes the star wheel to index to the position shown in FIGURE 5, producing an abutment between the stop and the star wheel, which prevents further clockwise rotation of brake arm 24. Thus, the clockwise rotation of brake arm 24 is stopped short of the point at which brake shoe 50 makes contact with cam stop 36. By shortening the length of the arc through which brake arm 24 rotates, brake shoe 50 is prevented from reengaging cam stop 36 and moving into tight frictional engagement with brake drum 18. Since there is only slight frictional engagement between brake shoe 50 and brake drum 18, the reel will continue to rotate in a clockwise direction until all or a portion of the hose has been retrieved onto the storage reel.

If the operator desires not to reel in the entire length of hose that has been extended, the brake can be reeffected at any intermediate hose length in the following manner. If the operator wishes to reel in for example only one-half of the length of hose that had been previously extended, he begins to pull on the hose when the half-way point has been reached. This pull changes the direction of reel rotation from clockwise to counterclockwise which returns the brake arm and star wheel 28 to the position indicated in FIGURE 2 and readies the lock mechanism for the next step in the cycle of operation. In this respect, after the operator has pulled on the hose a small amount to set the position shown in FIGURE 2, the hose is then released which sets the brake in the manner described hereinabove and illustrated in FIGURE 3.

Returning now to the second alternative presented hereinabove, that is the case where instead of retrieving all or a portion of the extended hose, the operator continues to pull the hose until a new pullout length is reached. When the desired new length is reached, a cycle of operation is followed which comprises the steps of: releasing the hose; pulling the hose; and releasing the hose a second time. This sequence of operation has been described hereinabove, and is sequentially illustrated by FIGURES 5, 2 and 3, respectively.

Thus, it will be appreciated that the present invention accomplishes all its intended objects, providing a brake mechanism for automatic rewind storage reels, which locks the reel against the action of a rewind torque. Furthermore, since there are no set stops built into the articles stored on the reel, or onto the retriever system, the rotation of the reel can be stopped at any position, and is not limited to particular stop stations. This permits the hose or cord stored on the reel to be locked against the rewind torque at any position over the entire length of the article. Since the brake mechanism does not engage the article stored on the reel, wear of the article due to frictional engagement with the brake mechanism is eliminated, which in turn assures the article a longer, useful and maintenance-free life. Furthermore, since the action of cam stop 36 is to direct brake shoe 50 into tight frictional engagement with brake drum 18, it will be appreciated that the braking forces are directly proportional to the rewind torque. That is, the greater the rewind torque, the greater will be the frictional engagement between brake shoe 50 and brake drum 18.

Having thus described our invention in detail, what we claim as new is:

1. In combination with a shaft supported rotatable reel and means for applying a rewind torque to said reel, a brake mechanism for preventing the rotation of said reel under influence of said rewind torque comprising:
    (a) an arm rotatably mounted on said shaft;
    (b) means for driving said arm in co-rotation with said reel as said reel rotates clockwise and counterclockwise;
    (c) a member carried by said arm and acting responsive to alternate clockwise and counterclockwise rotation of said reel for alternately limiting the co-rotational movement of said arm to a defined arc length and said arc length plus an additional arc increment;
    (d) brake means carried by said arm through said arcs of travel; and
    (e) means positioned in the path of travel of said brake means for forcing said brake means into tight frictional engagement with said reel when said arm rotates through said additional arc increment for stopping the rotation of said reel against said rewind torque.

2. The combination as set forth in claim 1 in which said member is pivotally mounted on said arm, and including means for rotating said member in one direction from one position to another responsive to the alternating clockwise and counterclockwise movement of said arm.

3. The combination as set forth in claim 2 wherein said means comprises a stop carried by said shaft and engageable with said member for rotating said member alternately from one position to another to limit alternately the length of the clockwise and counterclockwise movement of said arm to said defined arc length and said arc length plus an additional increment.

4. The combination as set forth in claim 3 in which said member is a star wheel.

5. The combination as set forth in claim 1 in which said brake means comprises:
    (a) a brake drum formed in said reel;
    (b) a brake shoe pivotally mounted on one end of said arm; and
    (c) means carried by said arm for urging said brake shoe into slight frictional engagement with said brake drum, whereby said arm is driven clockwise and counterclockwise in co-rotation with said reel.

6. The combination as set forth in claim 5 in which said means positioned in the arcuate path of travel of said brake means comprises a cam for forcing said brake shoe into tight frictional engagement with said brake drum.

7. In combination with a shaft supported reel and means for applying a rewind torque to said reel, a brake lock and release mechanism for preventing the rotation of said reel under the influence of said rewind torque comprising:
    (a) a brake member adapted for co-rotation with said reel as said reel is rotated clockwise and counterclockwise;
    (b) means acting responsive to clockwise and counterclockwise rotation of said reel for alternately limiting the co-rotational movement of said brake member to an arc length and said arc length plus an additional arc increment; and
    (c) means moving said brake member into tight frictional engagement with said reel when said brake member rotates through said additional arc increment for stopping the rotation of said reel against said rewind torque.

References Cited

UNITED STATES PATENTS 2,907,534  10/1959  Benstein _____ 242—86
3,339,030  8/1967  Nilsson _____ 242—107.3 X

FOREIGN PATENTS 824,475  12/1959  Great Britain.

WILLIAM S. BURDEN, Primary Examiner

U.S. Cl. X.R.

242—99, 107.3

PO-1050
(5/69)

UNITED STATES PATENT OFFICE
CERTIFICATE OF CORRECTION

Patent No. 3,462,096        Dated August 19, 1969

Inventor(s) Sidney W. Bailey and John R. Montgomery

It is certified that error appears in the above-identified patent and that said Letters Patent are hereby corrected as shown below:

```
Column 1, line 61  "brakes" should read --brake--.
Column 2, line  7  "in" should read --is--;
          line 54  "hteb rake" should read --the brake--;
          line 64  "valve" should read --axle--.
Column 3, line 26  "arms" should read --arcs--;
          line 60  "the hub" should read --hub--.
Column 4, line 31  "the hub" should read --hub--.
```

SIGNED AND
SEALED

MAR 31 1970

(SEAL)
Attest:

Edward M. Fletcher, Jr.
Attesting Officer

WILLIAM E. SCHUYLER, JR.
Commissioner of Patents